July 21, 1942. B. G. CARLSON ET AL Re. 22,138

GYRO-MAGNETIC COMPASS

Original Filed Dec. 2, 1938

INVENTORS,
BERT G. CARLSON, and
BRUNO A. WITTKUHNS,
BY
Arthur H. Serrell
Their ATTORNEY Reissued July 21, 1942

Re. 22,138

UNITED STATES PATENT OFFICE 22,138

GYROMAGNETIC COMPASS

Bert G. Carlson, Erieside, Ohio, and Bruno A. Wittkuhns, Summit, N. J., assignors to Sperry Gyroscope Company, Inc., Brooklyn, N. Y., a corporation of New York Original No. 2,242,233, dated May 20, 1941, Serial No. 243,488, December 2, 1938. Application for reissue December 11, 1941, Serial No. 422,556

9 Claims. (Cl. 33—222)

This invention relates to directional gyroscopes and, more particularly, to instruments of this type as used on aircraft instead of a compass. More particularly, this invention relates to directional gyroscopes controlled by a magnetic compass element which coerces the gyro axis into a position where its axis is either parallel or normal to the horizontal component of the earth's magnetic field. Such instruments are usually referred to in the art as gyro-magnetic compasses and are generally of two types, the single unit or direct type and the double unit or indirect type.

One object of this invention is to provide novel means of control by which the magnetic element directly or indirectly controls air jets used to spin the rotor in such a way as to exert torques on the gyroscopic element in a direction to precess the gyro wheel into the north-south plane or so as to maintain a predetermined position in azimuth.

In the accompanying drawing.

Figure 1:
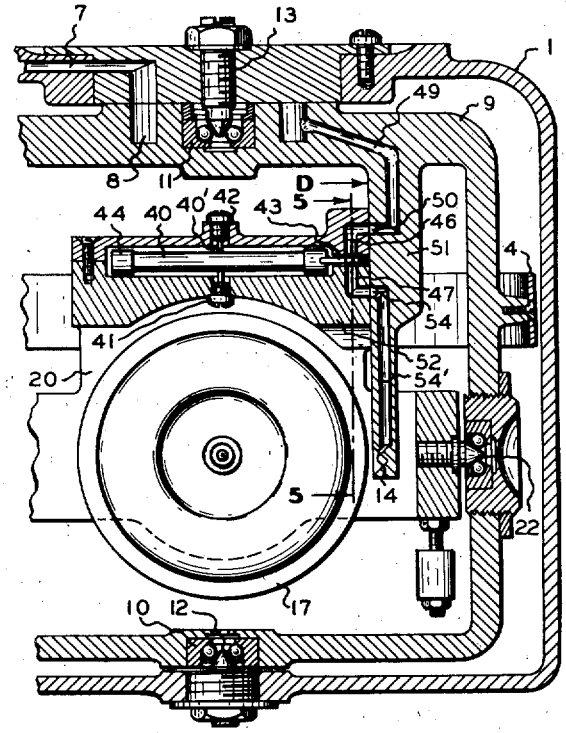
Fig. 1 is an elevation cross section through our gyro-magnetic compass.
Figure 5:
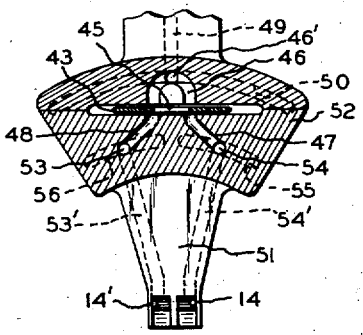
Fig. 5 is a vertical section on line 5—5 of Fig. 1.
Figure 2:
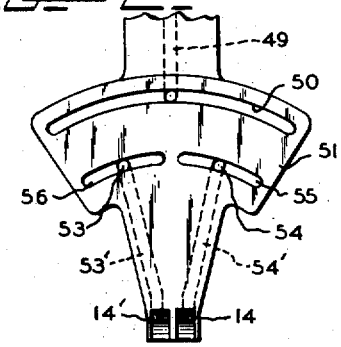
Fig. 2 is an elevation of part of Fig. 1 as viewed in the direction of arrow "D" in Fig. 1.
Figure 3:
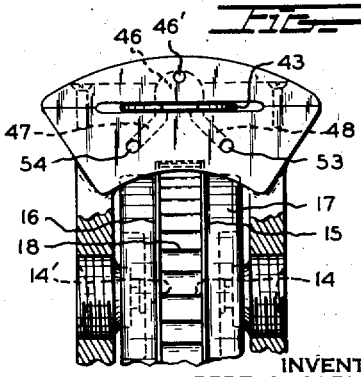
Fig. 3 is a view in elevation of that part of the rotor bearing ring adjoining the part shown in Fig. 2 and looking oppositely to arrow "D."

The gyro-magnetic compass as shown in Fig. 1 is of the single unit type and is contained within a sealed housing 1 containing a window (not shown) through which the dial or compass card 4 can be viewed. Air is exhausted from the casing through a pipe (not shown) and is admitted into the casing through an air duct 7 into an annular recess 8. This recess is machined into the vertical ring or frame 9 which carries the dial 4, the lower bearing 10 and the upper bearing 11. Pivots 12 and 13 engage these bearings so that the vertical frame 9 can rotate freely around the vertical axis. A very small air gap exists between the casing 1 and the vertical frame 9 so that there is a minimum of air leakage between the passage 7 and the annular recess 8. The air from the recess 8 is conducted to a pair of nozzles 14 and 14' (Fig. 3), of which only one is shown in Fig. 1. These nozzles are parallel to each other as seen in Figs. 2 and 3, and are spaced in such a way that the air jets issuing from them impinge on the rotor 17 just within the two flanges 15 and 16. Between the flanges are located a number of pockets or blades 18 which absorb the energy of the air jets and thereby spin the rotor. The purpose of having two such jets close together is to provide an automatic means for erection of the gyro wheel 17, as disclosed more in detail in the U. S. patent to Carlson, No. 1,982,637, for Directional gyroscopes. Whenever the gyro wheel tilts, one or the other of the flanges 15 or 16 will be subject to direct air pressure from one of the jets, causing a torque around the vertical axis to erect the gyro wheel and to hold its axis substantially normal with respect to the vertical axis of the frame 9.

Figure 4:
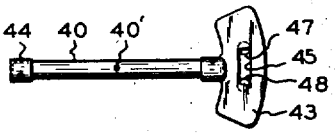
Fig. 4 is a plan view of the magnetic element of Fig. 1.

Instead of employing auxiliary jets to cause the gyroscope to follow the magnetic compass in azimuth, as has been prosposed in the prior art, we prefer, according to our invention, to utilize the above described spinning jets 14, 14' for this purpose by differentially intercepting the same upon relative displacement in azimuth of the magnetic needle and directional gyroscope. The magnetic needle 40 in this instance is shown as pivoted by means of a pintle 40' in bearings 41 and 42 mounted on the rotor bearing frame 20. Said needle is shown as carrying at one end an intercepting shutter or vane 43 and at the other end a balancing weight 44, so that the needle is perfectly balanced. Said shutter or vane is shown in Fig. 4 as having a short annular slot 45 therein normally lying between an upper elongated port 46 in an extension 52 on the rotor bearing frame 20, and lower spaced ports 47 and 48, also in said extension 52. The air is shown as supplied to port 46 from annular recess 8 through inclined pasasge 49 in the vertical ring, which terminates in an elongated arcuate recess 50 in an extension 51 of the vertical ring. From the recess 50 the air passes into the port 46 in the rotor bearing frame, which merges with port 46'. The air then passes downwardly through the slot 45 in the shutter and normally into both of the ports 47, 48, thence to ports 53, 54 in extension 52, whence the air passes into elongated recesses 55, 56 in the vertical ring, thence downwardly to the spinning jets 14, 14' through channels 53' and 54'. A very small air gap is maintained between the extension 52 of the rotor bearing frame and the extension 51 of the vertical frame so that the rotor bearing frame can tilt freely with respect to the vertical frame without at the same time causing appreciable loss of air, the arcuate ports 50, 55 and 56 maintaining uninterrupted air flow.

Normally, the ends of the slot 45 equally bisect or overlie the ports 47, 48, so that upon relative turning of the shutter and gyroscope in azimuth, one of the ports is gradually opened while the other is gradually closed, thus diminishing one of the spinning jets, 14, as the other, 14', is increased and vice versa. This results in unequal torques being exerted on the gyroscope about the horizontal axis of trunnion 22 by the two jets, thus causing precession in azimuth in the proper direction to cause the gyroscope to follow the magnetic needle.

Our improved differential control is very sensitive and provides smooth precession of the gyro, while at the same time averaging the relatively fast oscillations of the magnetic element. By the novel combination with two driving jets for normally keeping the gyro wheel erected of a magnetically operated shutter to differentially control the effect of the jets for obtaining precession torques, a simple and effective method has been produced which has the additional advantage that the magnet 40 may be fully enclosed in order to protect the same from possible disturbance by air currents in the casing.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described our invention, what we claim and desire to secure by Letters Patent is:

1. In a gyro-magnetic compass, a gyroscopic element comprising an air driven gyroscope having a horizontal spin axis normally in the east-west plane and mounted for three degrees of freedom, including a pair of driving jets spaced axially of the rotor, a compass element comprising magnetic means in the north-south plane supported on said gyroscope for freedom around the vertical axis, and baffle means on said magnetic element for differentially varying the air flow to said jets in response to the relative angular displacement in azimuth of said elements, whereby said gyroscope is precessed in azimuth until said displacement disappears.

2. In a gyro-magnetic compass, a gyroscope mounted for freedom about a vertical and a horizontal axis and for spinning about a second horizontal axis, magnetic direction seeking means supported on said gyroscope for freedom about the vertical axis, means forming a pair of normally balanced air jets for spinning said gyroscope spaced axially at the periphery thereof and to each side of said first named horizontal axis, and means carried on said magnetic means for differentially reducing the strength of one jet as compared to the other upon relative misalignment of said magnetic means and said horizontal axis in one direction.

3. In a gyro-magnetic compass, a casing, a ring mounted therein for orientation around a vertical axis, a rotor bearing member mounted in said frame for oscillation around a horizontal axis normally located in the north-south plane, a gyroscopic rotor supported on said member for spinning around another horizontal axis substantially in the east-west plane, a pair of normally equal air jets disposed on said frame for spinning and erecting said rotor and spaced axially at the periphery thereof and to each side of said first named horizontal axis, a permanent direction seeking magnet normally disposed in the north-south plane and mounted on said member for freedom around the vertical axis, a pair of air ducts in said member for conducting air separately to each of said jets, and means carried by said magnet for intersecting said ducts to differentially control the relative flow therethrough in accordance with the relative angular displacement of said magnet and said member in azimuth.

4. In a gyro-magnetic compass, a gyroscopic element comprising an air driven gyroscope having a horizontal spin axis mounted for three degrees of freedom, including a pair of air jets spaced axially of the rotor for spinning said rotor, a compass element comprising magnetic means mounted for freedom around the vertical axis, and means controlled by said two elements for differentially varying the air flow to said jets in response to the relative angular displacement in azimuth of said elements, whereby said gyroscope is precessed in azimuth until said displacement disappears.

5. In a gyro-magnetic compass, a gyroscopic element comprising an air driven gyroscope having a horizontal axis mounted for three degrees of freedom, including a pair of air jets spaced axially of the rotor for spinning said rotor, a magnetic compass element, a controller for differentially varying the air flow to said jets including ports leading to said jets and a baffle, the relative position of said ports and baffle being controlled by the relative displacement in azimuth of said magnetic compass and said gyroscope, whereby said gyroscope is precessed in azimuth until said displacement disappears.

6. In a gyro-magnetic compass, a gyroscope mounted for freedom about a vertical and a horizontal axis and for spinning about a second horizontal axis, magnetic direction seeking means supported for freedom about the vertical axis, means forming a pair of air jets for spinning said gyroscope displaced on respective sides of said first named horizontal axis, the reactions from which about said axis being normally equal and opposite, and means controlled by said gyroscope and said magnetic means for differentially reducing the strength of one jet as compared to the other upon relative azimuthal disagreement of said magnetic means and gyroscope, whereby an unbalanced torque is created about said horizontal axis to orient said gyroscope into agreement with said magnetic means.

7. In a gyro-magnetic compass, a casing, a ring mounted therein for orientation around a vertical axis, a rotor bearing member mounted in said frame for oscillation around a normally horizontal N-S axis, a gyroscopic rotor supported on said member for spinning around a normally horizontal E-W axis, a pair of normally equal air jets disposed on said ring for spinning and erecting said rotor and spaced on respective sides of said N-S horizontal axis so that the reactions therefrom about said horizontal axis are equal and opposite, a north-seeking magnet pivoted about a normally vertical axis on said member, a pair of air ducts in said member for conducting air separately to each of said jets, and port and baffle means differentially controlling the air flow through said ducts by the relative angular displacement of said magnet and said gyroscope in azimuth.

8. In an air spun slave directional gyroscope mounted for freedom about a vertical axis and a horizontal axis normal to the spin axis and including a pair of rotor spinning jets turnable with the gyroscope about said vertical axis and positioned on opposite sides of said horizontal axis of the gyroscope to both spin the gyro rotor and normally exert equal and opposite torques thereon about said horizontal axis, a magnetic compass, and relatively displaceable shutter and port means for differentially varying the air flow through said jets so as to unbalance said torques about said horizontal axis, thereby to cause precession in azimuth of said gyroscope, the relative displacement of said shutter and port means being governed by the relative displacement in azimuth of said gyroscope and magnetic compass.

9. Air jet spinning and precession controlling means for gyros in which a torque is exerted about one of its axes of universal support, the combination with a rotor, a rotor bearing frame and vertical ring, comprising two jet directing elements both of which are oriented with the vertical ring and spin the rotor, one of which tends to cause precession of the gyro and vertical ring in one direction and the other of which tends to cause precession in the opposite direction, means for equally supplying air to said jet directing elements, separate passages in the rotor bearing frame of said gyroscope leading to said jets, and a compass on said rotor bearing frame for differentially varying the flow of air to said jets upon relative turning of said compass and gyro in azimuth.

BERT G. CARLSON.
BRUNO A. WITTKUHNS.